United States Patent
Fin

(12) United States Patent  (10) Patent No.: US 6,415,550 B1
Fin  (45) Date of Patent: Jul. 9, 2002

(54) INTEGRAL LINEAR MOTOR

(75) Inventor: Enrico Fin, Lake Orion, MI (US)

(73) Assignee: Meritor Light Vehicle Systems, Inc., Troy, MI (US)

(*) Notice: Subject to any disclaimer, the term of this patent is extended or adjusted under 35 U.S.C. 154(b) by 0 days.

(21) Appl. No.: 09/498,401

(22) Filed: Feb. 4, 2000

(51) Int. Cl.[7] .............................................. E06B 7/16
(52) U.S. Cl. ........................ 49/442; 49/360; 49/349
(58) Field of Search ......................... 49/348, 349, 360, 49/362, 374, 375, 440, 441, 442

(56) References Cited

U.S. PATENT DOCUMENTS

| | | | | |
|---|---|---|---|---|
| 4,556,835 A | * | 12/1985 | Bogel et al. ................. | 318/663 |
| 5,172,046 A | * | 12/1992 | Dittner et al. ................. | 320/61 |
| 5,457,912 A | * | 10/1995 | Yates et al. ................... | 49/374 |
| 5,666,883 A | * | 9/1997 | Kuznetsov ................... | 104/281 |
| 5,832,667 A | * | 11/1998 | Buening et al. .............. | 49/212 |
| 5,868,077 A | * | 2/1999 | Kuznetsov ................... | 104/281 |
| 6,052,947 A | * | 4/2000 | Smith .......................... | 49/352 |
| 6,129,025 A | * | 10/2000 | Minakami et al. ........ | 104/88.01 |
| 6,161,995 A | * | 12/2000 | Wakazono et al. .......... | 409/191 |

* cited by examiner

Primary Examiner—Curtis A. Cohen
(74) Attorney, Agent, or Firm—Carlson, Gaskey & Olds

(57) ABSTRACT

A window lift mechanism including a rail, cursor and motor for moving a window. The rail provides a guide for the path of the window, when it is attached to the cursor, and houses a stator circuit associated with the motor. The motor also includes a moving element with suitable magnetic elements for generating a magnetic field perpendicular to the stator circuit. When the stator is engaged the magnetic field is cut thereby generating a directional force.

19 Claims, 3 Drawing Sheets

INTEGRAL LINEAR MOTOR

BACKGROUND OF THE INVENTION

The present invention relates to a window operating mechanism utilizing a rail, cursor, and motor. More preferably, the present invention pertains to a window lift mechanisms for automotive applications that utilizes a rail, cursor and motor integral with the rail that utilizes a plastic modular design, eliminating many typical components and thereby decreasing the cost of such a mechanism.

Window lift mechanisms typically occupy a large amount of space in a vehicle door. Most known systems have a large number of components mechanically connected to drive the window. These systems are somewhat complex and expensive. As an example, the systems include drums, cables, pulleys or other components. Brackets, gears and other components are used to mount and connect these components.

Further, most known window lift mechanism's include a number of metal parts. These parts can be driven into the vehicle cab in a collision, which is undesirable. Also, known window lift mechanisms are complex to assemble during manufacture of the vehicle.

It is to these purposes that the present invention is directed.

SUMMARY OF THE INVENTION

The present invention eliminates the need for much of the hardware or components typically associated with a window lift mechanism, such as the drum, cables, and pulleys of a drum and cable window regulator. The need for the brackets, gears and other components of a gear driven window regulator has also been eliminated by the present invention.

The present invention utilizes a plastic rail and cursor arrangement to impart motion to a window, thereby eliminating most of the mechanical means needed to impart motion when utilizing a typical window arrangement. The decrease in the number of components reduces the overall cost of the window lift mechanism, as well as simplifies the task of assembling the window lift mechanism during the manufacturing process.

In one embodiment, a window lift mechanism has a window connected to at least one cursor, at least one rail connected to a vehicle door, and a linear motor having a stator and a moving element with the moving element associated with the cursor, and the stator associated with the rail.

Removing many of the metal components, such as the gears, brackets, etc. of the typical window lift mechanism, and replacing them with a plastic modular rail system, reduces potential penetration of the door during a side impact collision.

It is therefore, the purpose of the present invention to cure those deficiencies covered above, by providing a window lift mechanism that utilizes a modular rail and cursor arrangement to provide a window lift mechanism that utilizes fewer components and occupies less space than a typical window lift mechanism.

DETAILED DESCRIPTION OF A PREFERRED EMBODIMENT

Figure 1:
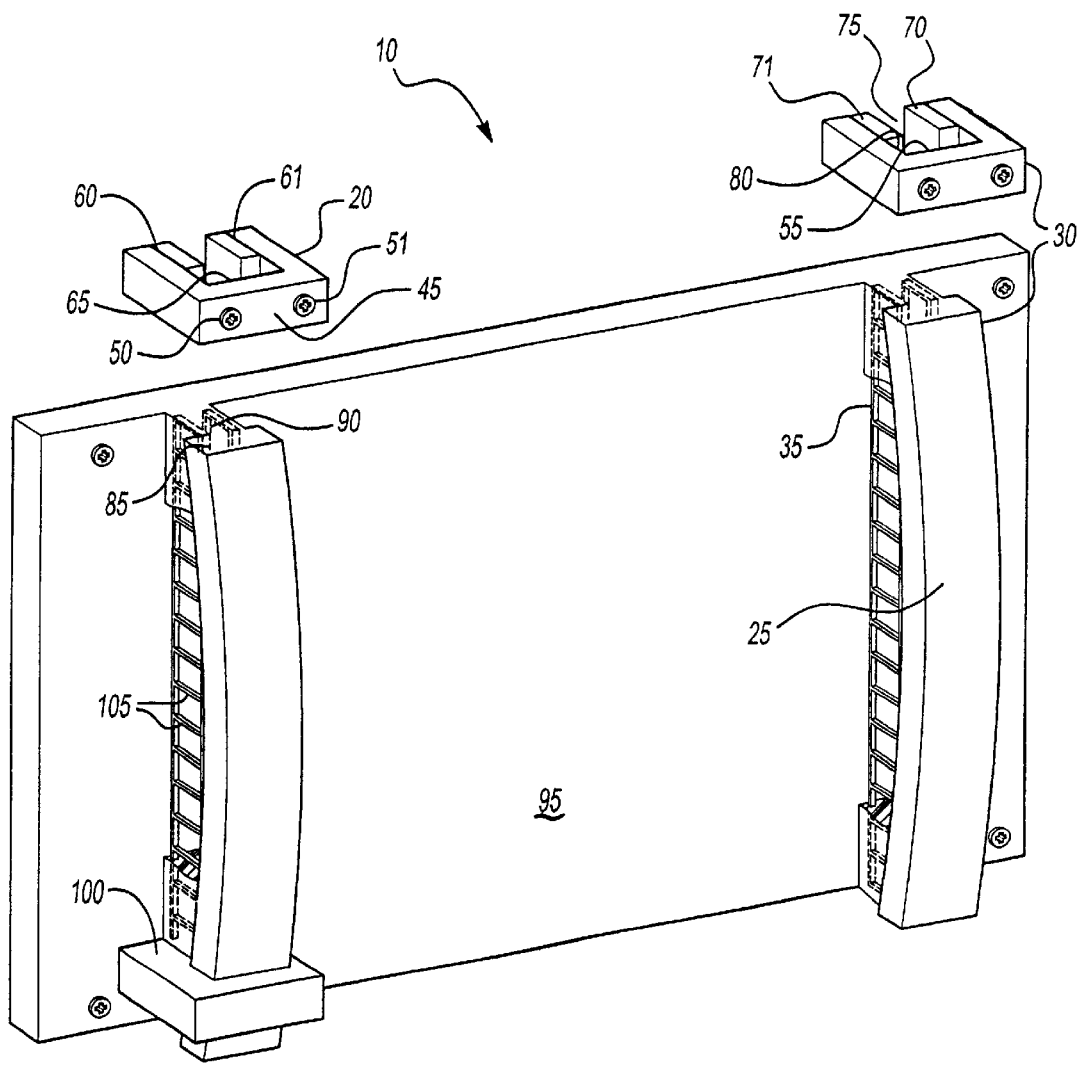
FIG. 1 is a perspective view of the window lift mechanism.
Figure 2A:
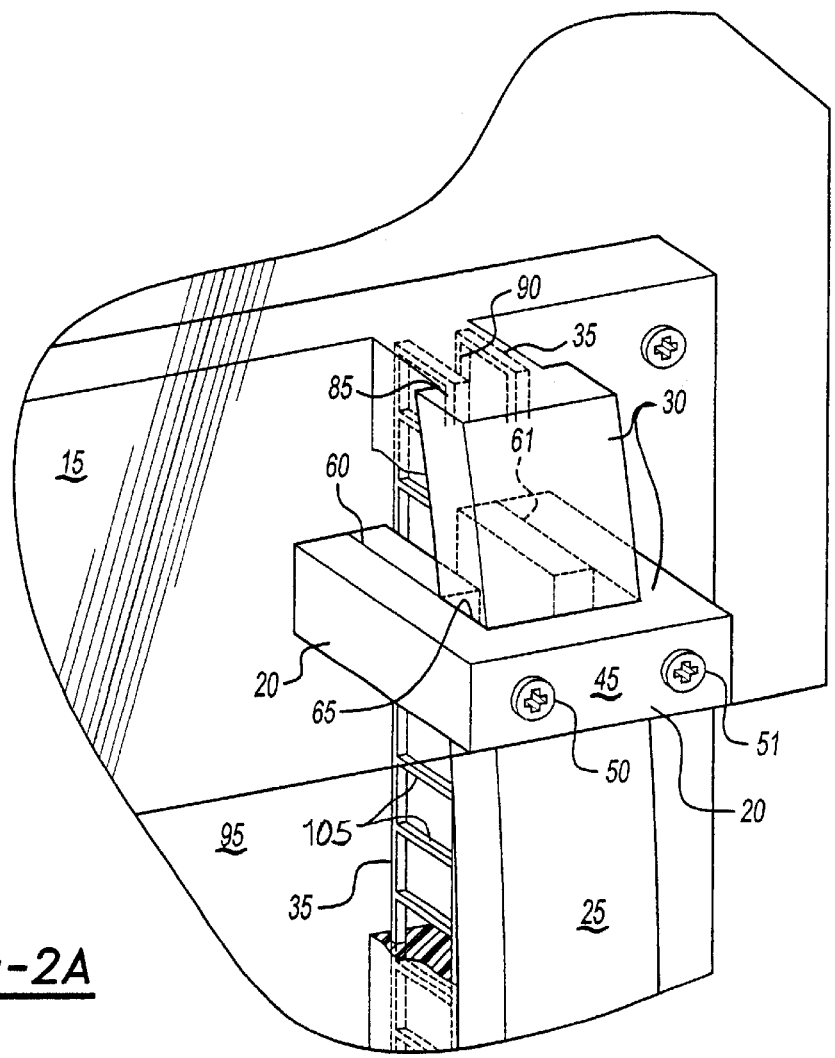
FIG. 2A is a cut away perspective view of the window lift mechanism.

As shown in FIG. 1, a window lift mechanism is shown generally at 10. As shown in FIG. 2A, the window lift mechanism 10 includes a window 15 connected to a cursor 20. The window lift mechanism 10 further includes a rail 25 which is connected to a vehicle door frame. At least one motor 30 has a stator 35 and a moving element.

Figure 2B:
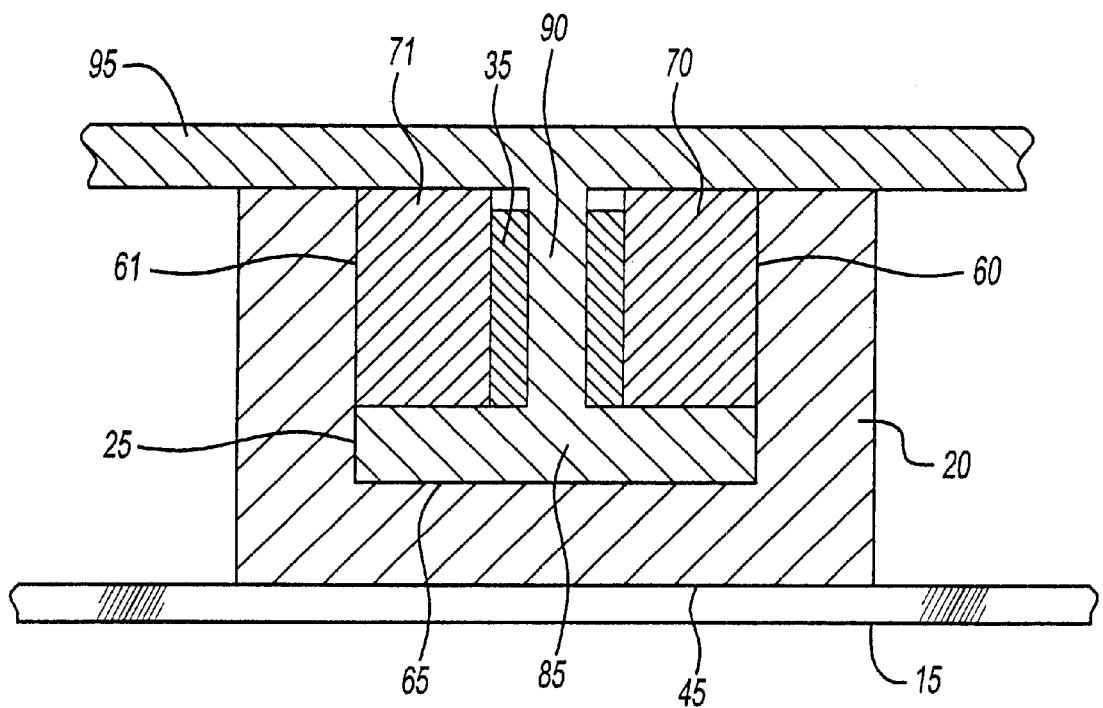
FIG. 2B is a cross-section showing the cursor mounted on the rail.

The cursor 20 is an element having a front face 45 with suitable attachments 50,51 designed to connect the window 15 to the cursor 20. While the illustrated embodiment of the cursor is rectangular, it is to be understood that other configurations may be used, such as, circular, elliptical, square, etc. As can be best understood from FIGS. 1 and 2B, cursor 20 also has a rectangular notch 55 formed centrally for engagement of the cursor 20 to the rail 25. The notch 55 has opposing side walls 60,61 and an endwall 65. Magnetic elements 70,71 are attached to the opposing side walls 60,61 thereby defining a gap 75 between the magnetic elements 70,71, for interacting with the stator 35. The magnetic elements 70,71, the opposing side walls 60,61 of the notch and the endwall 65 of the notch define an engagement space 80 for receiving the rail 25 when the cursor engages with the rail 25. While the illustrated embodiment utilizes opposing magnets, it is to be understood that other magnetic circuit arrangements may be utilized by the present invention. The rail 25 has a "t-shaped" cross-section with a corresponding top portion 85 that fits within the engagement space 80 when the cursor 20 engages with the rail 25. The rail also has a corresponding base portion 90 that fits within the gap 75 when the cursor 20 engages with the rail 25. In the illustrated embodiment, the rail 25 is integrally formed with a door module panel 95 that connects integrally with the base portion 90 of the rail 25. Of course, other rail attachment methods are possible.

The base portion 90 of the rail also includes a stator circuit. In the illustrated embodiment, the stator circuit is molded within the base portion 90 of the rail 25. While the illustrated embodiment of the stator 35 is molded within the rail 25, it is to be understood that the stator could be adhered or otherwise attached to the rail 25.

In the illustrated embodiment FIG. 2A, the stator 35 circuit is disposed along the main axis of the rail 25 and is ladder shaped with sequential rungs 105 perpendicular to the desired movement of the window 15.

Figure 3:
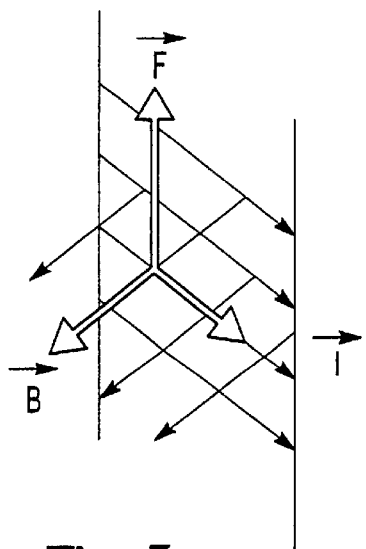
FIG. 3 is a vector representation of the interaction of the cursor and stator of the window lift mechanism detailing the electric current, magnetic field and resulting force.
Figure 4:
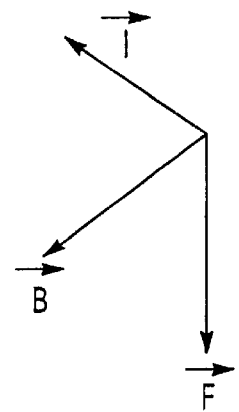
FIG. 4 is a vector representation of the interaction of the cursor and stator of the window lift mechanism detailing the electric current, magnetic field and resulting force.

The motor 30 includes the stator 35 and the moving element for moving the window 15 along its path, as determined by the length of the rail 25. The magnetic elements 70,71 included within the moving element, generate a magnetic field that is perpendicular to the rungs 105 of the stator 35. When the stator 35 is energized, or when a current is made to flow within the stator 35 circuit, the portion of rung 105 of the stator 35 circuit covered by the moving element cuts the magnetic field, and thereby, generates a directional force. Preferably, the rungs have approximately equal electric resistance, and thus apply a generally uniform force on the cursor along a movement path. The direction of the force, either upwards or downwards, can be regulated by the direction of the current flowing through the stator 35 circuit. FIGS. 3 and 4 are vector drawings of the interaction of the stator current (I), the magnetic field (B) and the force generated (F). Such motors are known, but have not been utilized for driving windows. Also, an appropriate control communicating with a window up/down switch is preferably included to drive the motor.

As can be seen from FIGS. 3 and 4, when the direction of the current (I) is reversed, the force generated is also reversed from an upward direction to a downward direction.

A suitable blocking mechanism 100, shown schematically is also included in the invention, to prevent movement of the window 15 when the stator 35 circuit is not energized. While a preferred embodiment is disclosed, a worker in this art would understand that various modifications would come within the scope of the invention. Thus, the following claims should be studied to determine the true scope and content of this invention.

What is claimed is:

1. A window and lift mechanism comprising:
   a window connected to at least one cursor;
   at least one rail to be connected to a vehicle; and
   an electric motor having a stator receiving electrical current and a moving element to be driven by said stator through magnetic force; with
   said moving element fixed to move with said cursor; and said stator fixed with said rail.

2. The window lift mechanism of claim 1, wherein the at least one cursor comprises magnetic elements for forming said moving element.

3. The window lift mechanism of claim 2, wherein the suitable magnetic elements create a magnetic field perpendicular to a main axis of the stator.

4. The window lift mechanism of claim 1, wherein the stator comprises a ladder-shaped circuit with rungs.

5. The widow lift mechanism of claim 4, wherein the stator carries a current and cuts a magnetic field of the cursor at a location where the cursor covers a rung of the stator, and creates a vertical force that is applied to the cursor to cause movement of the window along its path.

6. The window lift mechanism of claim 5, further including a blocking element to maintain the window in a stationary position when the stator is not energized to cause movement of the window along its path.

7. The window lift mechanism of claim 4, wherein the current directionally flows in the stator to create an upward force that is applied to the cursor.

8. The window lift mechanism of claim 5, wherein the current directionally flows in the stator to create a downward force that is applied to the cursor.

9. The window lift mechanism of claim 4, wherein all of the rungs of the stator have the same electrical resistance, for applying a uniform force on the cursor along the path of movement of the window.

10. The window lift mechanism of claim 1, wherein the at least one rail has a main axis parallel to the desired path of movement of the window.

11. The window lift mechanism of claim 1, wherein the at least one cursor slidably engages the at least one rail to define a path of movement of the window.

12. The window lift mechanism of claim 1, wherein the stator is integrally molded with the at least one rail.

13. The window lift mechanism of claim 1, wherein the at least one rail is formed of plastic.

14. The window lift mechanism of claim 1, wherein the at least one rail has a T-shaped cross section.

15. The window left mechanism of claim 1, wherein the at least one cursor includes a notch formed therein.

16. The window lift mechanism of claim 15, wherein the notch is defined by opposing side walls and an end wall.

17. The window lift mechanism of claim 16, wherein the opposing sidewalls, end walls, and opposing magnets define a gap for engaging the at least one rail.

18. A window and lift mechanism comprising:
    a window connected to at least one cursor having suitable magnetic elements, and a T-shaped notch formed centrally therein;
    at least one rail having a T-shaped cross section to be connected to a vehicle said cursor mounted on said rail; and
    an electric motor having a stator that is a ladder-shaped circuit with rungs and receives an electrical current and a moving element to be driven by said stator through magnetic force; with
    said moving element fixed to move with said cursor;
    and said stator fixed with said rail.

19. A door comprising:
    a window connected to at least one cursor;
    at least one rail connected to a vehicle door module;
    an electric motor having a stator receiving electric current and a moving element to be driven by said stator through magnetic force, with said moving element fixed to move with said cursor;
    said stator fixed with said rail; and
    said rail being integrally molded with said door module, for attachment to a vehicle.

* * * * *